United States Patent
Brick et al.

(10) Patent No.: US 11,202,058 B2
(45) Date of Patent: Dec. 14, 2021

(54) 3D DISPLAY ELEMENT, 3D DISPLAY SYSTEM, METHOD OF OPERATING A 3D DISPLAY ELEMENT AND METHOD OF OPERATING A 3D DISPLAY SYSTEM

(71) Applicant: OSRAM OLED GMBH, Regensburg (DE)

(72) Inventors: Peter Brick, Regensburg (DE); Hubert Halbritter, Dietfurt (DE); Mikko Peraelae, Tegernheim (DE); Frank Singer, Regenstauf (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 16/120,094

(22) Filed: Aug. 31, 2018

(65) Prior Publication Data

US 2019/0075286 A1 Mar. 7, 2019

(30) Foreign Application Priority Data

Sep. 7, 2017 (DE) .................... 10 2017 120 648.5

(51) Int. Cl.
*H04N 13/302* (2018.01)
*H04N 13/351* (2018.01)
(Continued)

(52) U.S. Cl.
CPC .......... *H04N 13/302* (2018.05); *G02B 30/27* (2020.01); *H04N 13/305* (2018.05); *H04N 13/327* (2018.05); *H04N 13/351* (2018.05)

(58) Field of Classification Search
CPC .. H04N 13/351; H04N 13/302; H04N 13/305; H04N 13/317; H04N 13/366;
(Continued)

(56) References Cited

U.S. PATENT DOCUMENTS 5,777,720 A * 7/1998 Shapiro .............. G02B 27/0093
351/237
5,982,342 A 11/1999 Iwata et al.
(Continued)

FOREIGN PATENT DOCUMENTS

DE 19827590 A1 12/1999
DE 102007026628 A1 8/2008
(Continued)

OTHER PUBLICATIONS

Korean Office Action dated Jul. 22, 2019 in Korean Patent Application No. 2018-0106393, and English translation thereof.
(Continued)

*Primary Examiner* — Nathnael Aynalem
(74) *Attorney, Agent, or Firm* — Slater Matsil, LLP

(57) ABSTRACT

A 3D display element (2) comprising a plurality of emission regions (20) adapted to emit electromagnetic radiation (L), wherein at least some emission regions (20) are associated with a first group and at least some emission regions (20) are associated with a second group (21, 22), wherein by means of the emission regions (20) of the first group (21) respectively a pixel (100) of a first perspective (11) of an image (B) can be represented, and by means of the emission regions (20) of the second group (22) respectively a pixel (100) of a second perspective (12) of the image (B) can be represented the sum of all emission regions (20) is greater than the sum of all pixels (100) of all perspectives (11, 12).

14 Claims, 6 Drawing Sheets

(51) Int. Cl.
*H04N 13/305* (2018.01)
*G02B 30/27* (2020.01)
*H04N 13/327* (2018.01)

(58) Field of Classification Search
CPC ............... H04N 13/373; H04N 13/398; H04N 2213/001; H04N 13/354; H04N 13/349; G09G 2300/023; G02B 30/27; G02B 30/28; G02B 30/29; G02B 30/22; G02B 30/34; G02B 30/35; G02B 30/36; G02B 30/20
USPC ............. 348/51, 54, 55, 56, 58, 59; 345/419
See application file for complete search history.

(56) References Cited

U.S. PATENT DOCUMENTS

| | | | | |
|---|---|---|---|---|
| 8,358,335 B2* | 1/2013 | de la Barre | ............ | G09G 3/003 348/54 |
| 10,021,375 B2* | 7/2018 | Kim | .................. | G02B 27/2214 |
| 2005/0083516 A1* | 4/2005 | Baker | ................. | G02B 27/225 356/124 |
| 2006/0215018 A1* | 9/2006 | Fukushima | ........ | G02B 27/2214 348/51 |
| 2007/0268589 A1 | 11/2007 | Ra et al. | | |
| 2011/0032346 A1* | 2/2011 | Kleinberger | ......... | H04N 13/305 348/59 |
| 2011/0216061 A1 | 9/2011 | Barre et al. | | |
| 2013/0321598 A1* | 12/2013 | Inoue | ....................... | G09G 3/20 348/54 |
| 2016/0241847 A1 | 8/2016 | Kim et al. | | |

FOREIGN PATENT DOCUMENTS

| | | |
|---|---|---|
| DE | 102009056591 A1 | 6/2011 |
| DE | 102010021550 A1 | 11/2011 |
| JP | H10-56654 A | 2/1998 |
| KR | 10-2007-0111763 A | 11/2007 |
| KR | 10-2011-0100123 A | 9/2011 |
| WO | 2012/069071 A1 | 5/2012 |

OTHER PUBLICATIONS

Notice of Final Rejection received in KR Patent Application No. 10-2018-0106393, dated Dec. 12, 2019.
1st Office Action received in Chinese Patent Application No. 201811038110.1, dated Sep. 2, 2020.
Trial Decision received in Korean Patent Application No. 10-2018-0106393, dated Sep. 23, 2020.
Examination Report received in DE Patent Application No. 102017120648.5, dated Nov. 26, 2020.

* cited by examiner

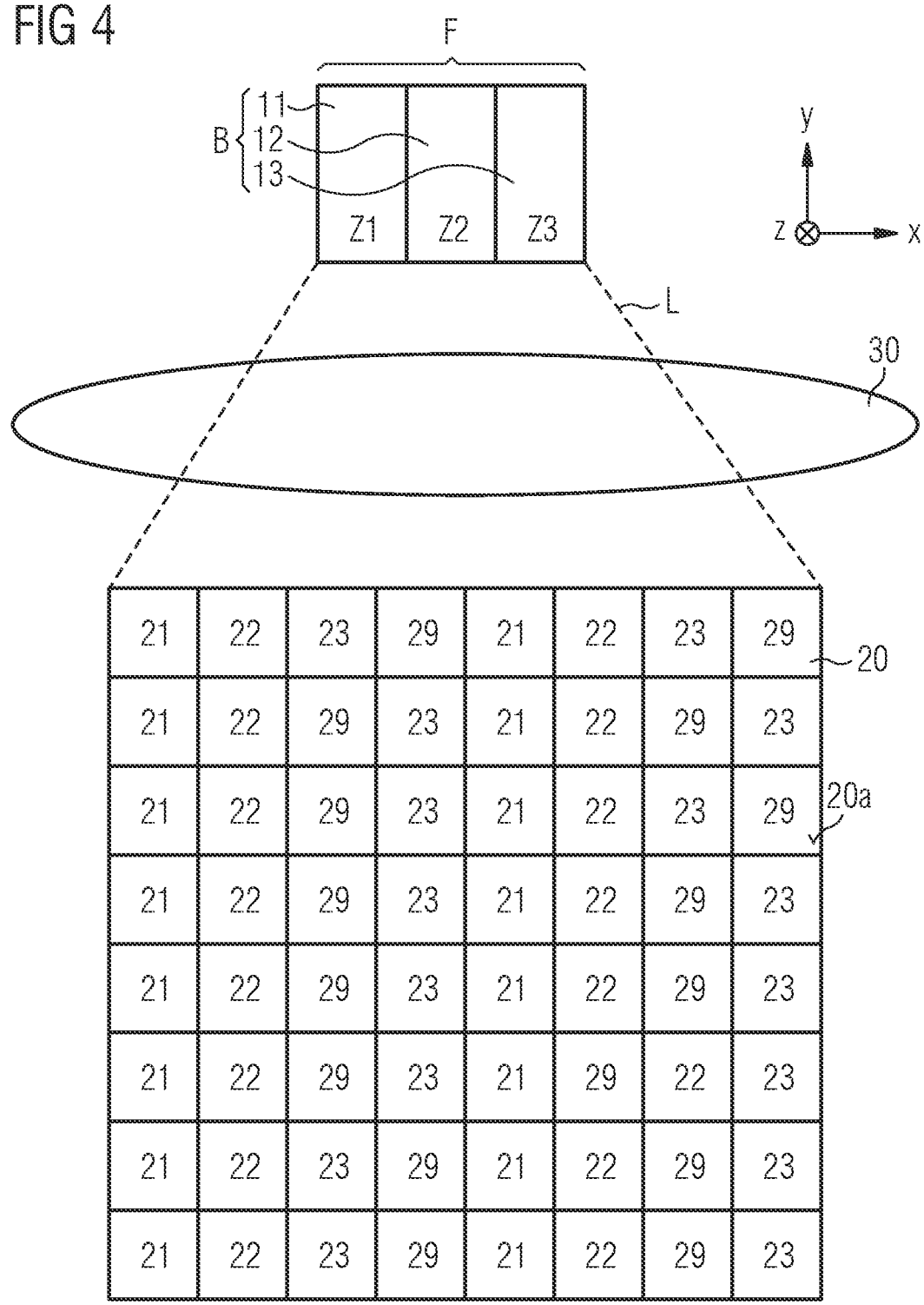

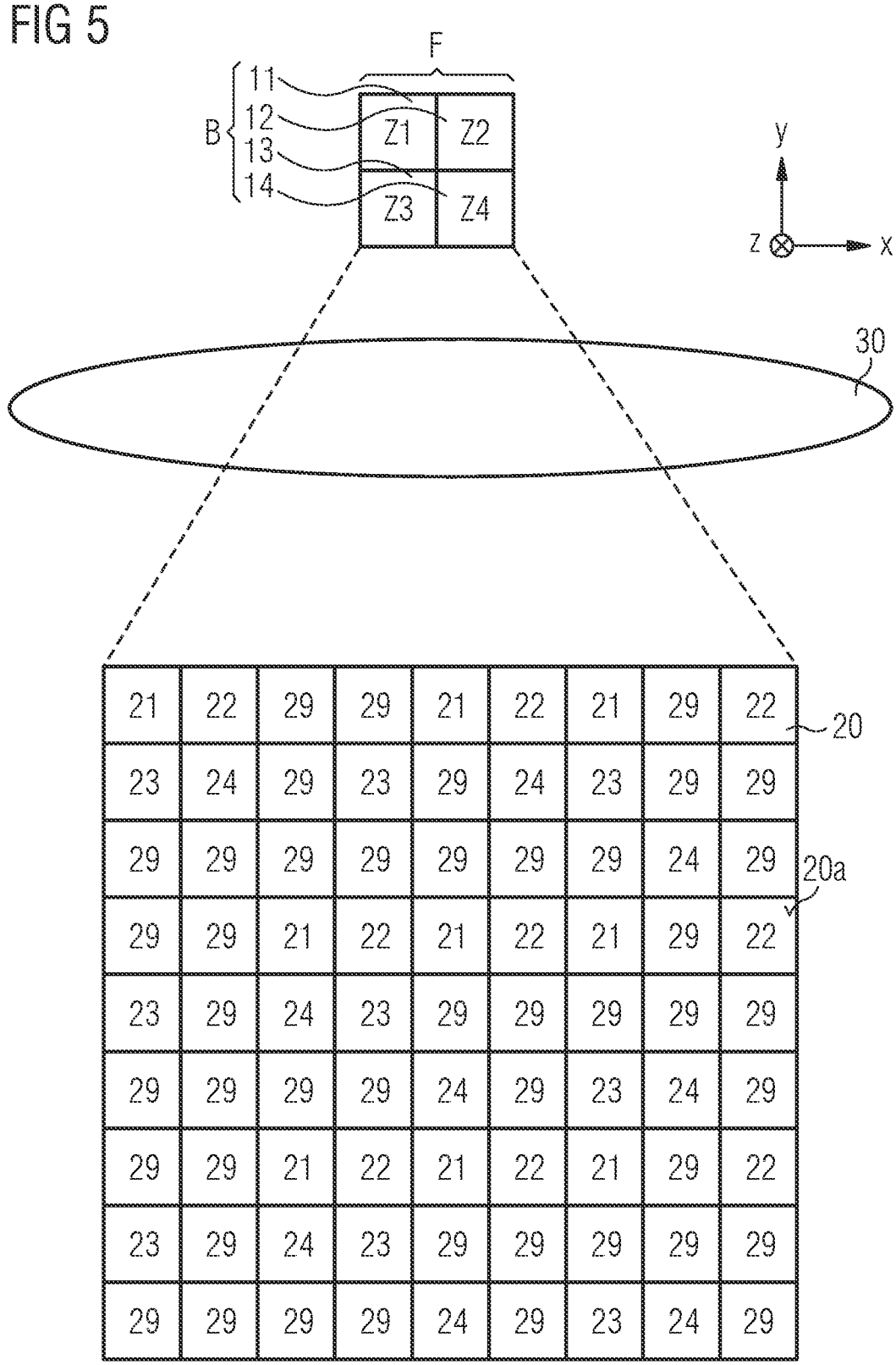

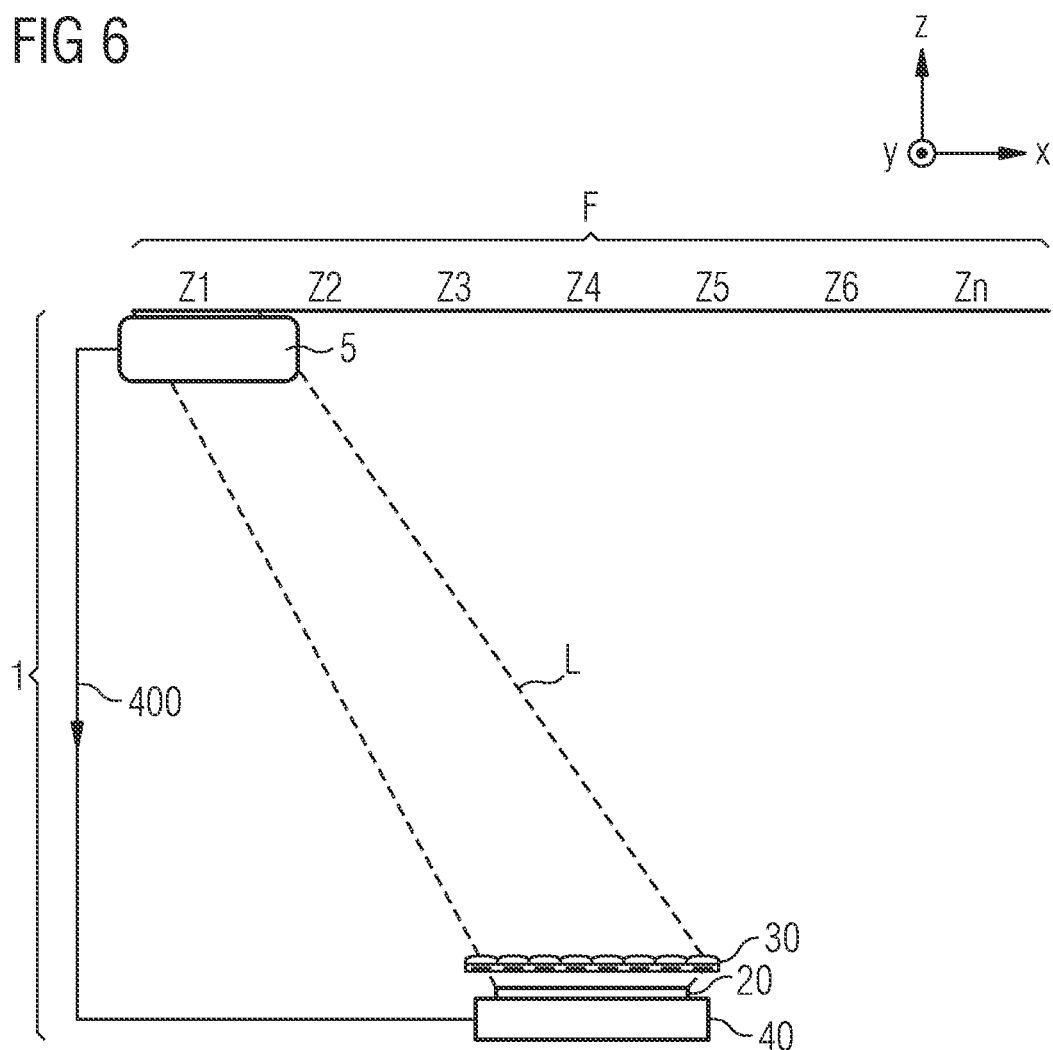

3D DISPLAY ELEMENT, 3D DISPLAY SYSTEM, METHOD OF OPERATING A 3D DISPLAY ELEMENT AND METHOD OF OPERATING A 3D DISPLAY SYSTEM

A 3D display element is specified and a 3D display system is specified. In addition, a method for operating a 3D display element and a method for operating a 3D display system are specified.

One of the tasks to be solved is to specify a 3D display element with improved radiation characteristics. Another task to be solved is to specify a 3D display system with which a 3D display element can be calibrated particularly well, so that it has, for example, an improved radiation characteristics. Another task to be solved is to specify a method of operating a 3D display element that improves the radiation characteristics of the 3D display element. Another task to be solved is to specify a method for operating a 3D display system, by means of which a 3D display element can be calibrated particularly efficiently.

The 3D display element, for example, is an autostereoscopic display that allows the viewer to view an image in three dimensions. By means of the 3D display element, different perspectives of an image can be displayed side by side. In particular, a viewer can simultaneously perceive two different perspectives of an image within a field of view, creating a three-dimensional image impression for the viewer.

According to at least one embodiment, the 3D display element comprises a large number of emission regions designed to emit electromagnetic radiation. The emission regions are, for example, light emitting diodes that emit electromagnetic radiation from a specified colour locus during intended operation. In particular, the emission regions are designed to emit electromagnetic radiation in the visible wavelength range. For example, the emission regions are set up to emit electromagnetic radiation from a given colour location which lies in a wavelength range between infrared radiation and UV radiation.

The emission regions can each be formed with several light emitting diodes emitting electromagnetic radiation from a different colour location. For example, each emission region comprises a light emitting diode established to emit electromagnetic radiation with a red colour location, a light emitting diode established to emit electromagnetic radiation with a green colour location, and a light emitting diode established to emit electromagnetic radiation with a blue colour location. In particular, only mixed light from the light-emitting diodes assigned to a common emission region can be perceived by the observer within a field of view.

For example, the light emitting diodes can be manufactured in a common manufacturing process and be formed with a common semiconductor body. In particular, a conversion element can be arranged downstream of the light emitting diodes, which converts the electromagnetic radiation generated within the light emitting diodes into electromagnetic radiation of a different colour location. Alternatively, the light emitting diodes can be manufactured separately from each other in a separate manufacturing process, so that the light emitting diodes are formed with semiconductor bodies of different types, which, for example, comprise different materials from each other. For example, electromagnetic radiation of different color locations is then generated in the light emitting diodes, which are manufactured in separate manufacturing processes, during intended operation.

According to at least one embodiment, at least some emission regions are assigned to a first group and at least some emission regions are assigned to a second group. In particular, emission regions assigned to different groups can be identical in construction. In particular, not all emission regions of the 3D display element are assigned to one of the two groups, but there are further groups of emission regions.

According to at least one embodiment, by means of the emission regions of the first group respectively a pixel of a first perspective of an image is represented. In particular, the first perspective of an image can be represented by means of the entirety of the emission regions of the first group. In this context, a perspective describes a two-dimensional representation of an image. For example, the first perspective can be perceived as a two-dimensional representation of an image by a viewer within the field of view.

According to at least one embodiment, by means of the emission regions of the second group respectively a pixel of a second perspective of the image is represented. In particular, the second perspective of the image can be represented by means of the entirety of the emission regions of the second group. In particular, the second perspective is different from the first perspective. For example, the first group and the second group may have the same number of emission regions assigned to them. For example, the number of emission regions assigned to the first group differs by a maximum of 10%, in particular by a maximum of 5%, from the number of emission regions assigned to the second group.

According to at least one embodiment, the sum of all emission regions is greater than the sum of all pixels of all perspectives. For example, each perspective can be represented by means of exactly one group of emission regions. In particular, each perspective is uniquely assigned to a group of emission regions. For example, the number of groups of emission regions is one greater than the number of perspectives.

According to at least one embodiment, the 3D display element comprises a plurality of emission regions designed to emit electromagnetic radiation. At least some emission regions are assigned to a first group and at least some emission regions are assigned to a second group, wherein a pixel of a first perspective of an image can be represented respectively by means of the emission regions of the first group, and a pixel of a second perspective of the image can be represented respectively by means of the emission regions of the second group. The sum of all emission regions is greater than the sum of all pixels of all perspectives.

A 3D display element described here is based on the following considerations, among others. In a 3D display element, by means of which a three-dimensional representation of an image can be perceived by the naked eye, i.e. without the use of additional aids such as shutter glasses or polarisation filters, it must be possible to display different perspectives of an image in a field of view. In particular, the different perspectives must be representable within spatially separated zones, which are arranged next to each other within the field of view. For this purpose, the emitted electromagnetic radiation from emission regions that are assigned to a common group is directed into a common zone. Different zones are arranged next to each other in the field of view. To enable a particularly realistic three-dimensional image impression using the 3D display element, particularly exact adjustment of the emission regions and any subsequent optical elements is necessary so that the electromagnetic radiation of each emission region is directed into the zone assigned to the emission region.

The 3D display element described herein makes use of the idea of providing a larger number of emission regions than actually required to display all perspectives in intended operation. Consequently, some of the emission regions may only be used compensatory. Thus, for example, emission regions whose electromagnetic radiation is not directed into a designated zone due to misalignment, or whose electromagnetic radiation does not have the specified properties, can be compensated by means of another emission region.

Advantageously, defective or misaligned emission regions can be compensated by means of such a 3D display element, whereby the 3D display element has particularly good radiation properties.

According to at least one embodiment, the 3D display element comprises an optical element which is arranged downstream of the multitude of emission regions in a radiation direction. For example, the optical element is designed to influence electromagnetic radiation. For example, the optical element is a lens, in particular a lens array with a large number of lenses arranged side by side in a lateral plane. For example, at least one lens is subordinate to each emission region. In particular, the lens array can comprise a large number of cylindrical lenses, whereby several emission regions are assigned to a cylindrical lens. In particular, the optical element directs the electromagnetic radiation of the emission regions to a predetermined position within a zone assigned to the emission regions.

For example, the emission regions are arranged next to each other in a lateral plane. In particular, the emission regions are arranged at the nodes of a grid. For example, the grid is a periodic, especially regular, rectangular or hexagonal grid. The emission regions are designed to emit electromagnetic radiation in a common direction of radiation. For example, the direction of radiation is transverse, especially perpendicular to the plane in which the emission regions are arranged. The direction of radiation indicates the direction in which at least a major part of the electromagnetic radiation is emitted during the intended operation of the emission regions. In particular, the direction of radiation is the direction in which at least a major part of the electromagnetic radiation is emitted during the intended operation of the emission regions before the electromagnetic radiation is influenced and/or deflected by means of an optical element. For example, the intensity of the electromagnetic radiation emitted has a maximum in the direction of radiation.

According to at least one embodiment, the optical element directs electromagnetic radiation of the first group into a first zone within a field of view, and the optical element directs electromagnetic radiation of the emission regions of the second group into a second zone within the field of view. The first zone is located in a first lateral direction next to the second zone. In particular, the optical element directs the electromagnetic radiation of each emission region of the first group into the first zone and the electromagnetic radiation of each emission region of the second group into the second zone. For example, for a viewer in the first zone of the field of view, the first perspective represented in the first zone can be perceived as a two-dimensional representation of the image. Furthermore, for a viewer in the second zone of the field of view, the second perspective represented in the second zone can be perceived as a two-dimensional representation of the image.

The first and second zones are arranged next to each other in the first lateral direction, with the first lateral direction perpendicular to the radiation direction of the emission regions. For example, the first zone and the second zone within the field of view are essentially non-overlapping. In particular, the first zone within the field of view may be directly adjacent to the second zone. Advantageously, for an observer who is in the field of view, the first perspective within the first zone can be perceived with a first eye and the second perspective within the second zone can be perceived with a second eye can at the same time. This creates a three-dimensional impression of the image for the viewer.

According to at least one embodiment, the 3D display element comprises emission regions of a third group, wherein the optical element directs electromagnetic radiation of the emission regions of the third group into a third zone within the field of view and the third zone is arranged in a second lateral direction adjacent the first and/or second zone. For example, the third group may comprise as many emission regions as the first and/or the second group. In particular, the number of emission regions of the third group differs from the number of emission regions of the first and/or second group by a maximum of 10%, in particular a maximum of 5%. The emission regions of the third group are arranged in the same lateral plane as the emission regions of the first and/or second group. In particular, the emission regions of the third group have the same radiation direction as the emission regions of the first and/or second group.

For example, the optical element directs the electromagnetic radiation of the emission regions of the third group into the third zone, whereby a third perspective of the image can be represented by means of all the emission regions of the third group in the third zone. In particular, the 3D display element comprises a plurality of groups of emission regions with which electromagnetic radiation is emitted into a plurality of zones within the field of view. The plurality of zones are arranged next to each other in the first and/or second lateral direction. In particular, the zones in the field of view are arranged at the nodes of a periodic, especially regular, grating. For example, the zones in the field of view are arranged at the nodes of a rectangular grid or a hexagonal grid. The second lateral direction is perpendicular to the first lateral direction and perpendicular to the direction of radiation. Advantageously, a three-dimensional representation of the image can be perceived by a viewer along the first lateral direction and along the second lateral direction by means of such a 3D display element.

According to at least one embodiment, the 3D display element comprises a memory in which calibration data are stored, the calibration data defining the allocation of the emission regions to the groups. The memory is a flash memory, for example, which is designed as part of the 3D display element. In particular, the calibration data can be determined before the 3D display element is operated as intended and stored in the memory. In addition, the memory may contain further data which is called up during the intended operation of the 3D display element and by means of which the control of the emission regions of the 3D display element is influenced. Advantageously, the assignment of the emission regions to the groups makes it possible to assign the emission regions to a group after the production of the 3D display element on the basis of the calibration data stored in the memory.

According to at least one embodiment some of the emission regions are assigned to a further group, whereby by means of electromagnetic radiation the emission regions of the further group no perspective of the image within the field of view can be represented. For example, the emission regions of the further group are arranged in the same lateral plane as the emission regions of the first, second and/or third group. For example, between 1% and 40% inclusive of the emission regions, in particular between 5% inclusive and 15% inclusive of the emission regions, are assigned to the further group. In particular, the electromagnetic radiation of the emission regions of the further group is not directed into the field of view and/or into different zones within the field of view.

According to at least one embodiment, the emission regions of different groups are arranged in a common lateral plane and form an emission surface. For example, the emission regions are arranged next to each other. The emission regions of different groups are distributed over the entire emission surface. In particular, all emission regions are arranged next to each other in the common lateral plane. The emission surface, for example, is an imaginary area composed of all the emission regions that are designed to represent perspectives of an image. For example, the emission surface has a rectangular contour. The emission regions of a group can be distributed over the entire emission surface. In particular, the emission regions of different groups may be arranged in an alternating manner along the first and/or second lateral direction.

A 3D display system is also specified. Within the 3D display system, a 3D display element described here can be calibrated.

According to at least one embodiment, the 3D display system comprises a 3D display element and a detector, wherein the detector is arranged downstream of the 3D display element in the radiation direction within the field of view at a predetermined position, electromagnetic radiation can be detected by means of the detector and the electromagnetic radiation can be uniquely assigned to an emission region.

For example, the detector is a CCD sensor or a CMOS sensor, by means of which electromagnetic radiation emitted by the 3D display element can be detected. In particular, the detector is arranged downstream of the 3D display element in the radiation direction in such a way that the electromagnetic radiation from emission regions which emit their electromagnetic radiation into a common zone can be detected simultaneously by means of the detector. In particular, the electromagnetic radiation of each emission region has a property which makes it possible to uniquely assign the electromagnetic radiation to an emission region. For example, the property is a color location, an intensity, or a modulation of the color location and/or the intensity of the electromagnetic radiation emitted.

According to at least one embodiment, the 3D display system comprises a memory, wherein calibration data is determinable by means of the detector and the memory comprises calibration data determined by means of the detector. The calibration data include, for example, an assignment of the individual emission regions to the groups. Thus, the calibration data shows which emission regions are set up to represent the same perspective within the same zone.

A method of a 3D display element is also specified. In particular, a 3D display element described here can be operated with this method. This means that all features disclosed for the 3D display element are also disclosed for the method of operating the 3D display element and vice versa.

In accordance with at least one embodiment of the method for operating a 3D display element, in particular a display element described here, having a plurality of emission regions, in which at least some emission regions are uniquely assigned to the first, the second or the further group, wherein a pixel of a first perspective of an image is represented respectively by means of the emission regions of the first group and a pixel of a second perspective of an image respectively is represented by means of the emission regions of the second group and emission regions of the further group are not operated. In particular, the first perspective is presented using the first emission regions in the first zone and the second perspective using the second emission regions in the second zone. The first zone is located in a first lateral direction next to the second zone within the field of view. In particular, the emission regions of the further group are never operated in the intended operation of the 3D display element.

According to at least one embodiment of the method, the calibration data are stored in the memory, the calibration data assigning the emission regions to a group, and the emission regions are operated depending on the assignment to a group. The calibration data may have been determined before the 3D display element was used as intended and stored in the memory. In addition, the memory can contain further data, depending on which the emission regions are controlled in the intended operation. For example, the further data may include the position of the emitted electromagnetic radiation of an emission region within a zone assigned to the emission region.

According to at least one embodiment of the method, electromagnetic radiation from emission regions of a group is directed into a common zone, electromagnetic radiation from emission regions of different groups is directed into different zones, and each perspective of the image is represented by a group of emission regions. In particular, the zones are arranged next to each other in the first and/or second lateral direction in the field of view. For example, the zones do not overlap each other within the field of view. For example, each position within the field of view can be uniquely assigned to a zone. For example, electromagnetic radiation is directed into each zone from exactly one group of emission regions. For example, the 3D display element has at least five, preferably ten, in particular at least 50 different groups of emission regions.

According to at least one embodiment of the method, different zones are arranged side by side in the field of view along a first and/or second lateral direction. Within each zone, a different perspective of an image can be displayed using the 3D display element. In particular, the zones in the field of view are arranged next to each other in such a way that different perspectives in different zones adjacent to each other can be perceived with both eyes by a viewer within the field of view. Advantageously for the viewer arises a three-dimensional impression of the image.

In accordance with at least one embodiment of the method, a method for operating a 3D display system is also specified. This method can be used in particular to operate a 3D display system described here. This means that all features disclosed for the 3D display system are also disclosed for the process and vice versa.

According to at least one embodiment of the method, in a process step A) the detector is arranged downstream of the 3D display element in the direction of radiation within the field of view at a predetermined position. In a process step B), the emission regions emit electromagnetic radiation, whereby the electromagnetic radiation of each emission region can be uniquely assigned to it. In a process step C) the electromagnetic radiation is detected by the detector. In a process step D), a group of emission regions is uniquely assigned to each zone in the field of view, from which the calibration data is generated and stored in the memory. In particular, the detector is arranged downstream of the 3D display element in such a way that electromagnetic radiation emitted by the emission regions of the 3D display element can be detected by the detector. Furthermore, in process step B), the electromagnetic radiation of each emission region can be uniquely assigned to it, since the individual emission regions emit electromagnetic radiation during successive time periods. Alternatively, the intensity and/or the colour location can be modulated with the aid of electromagnetic radiation, so that the electromagnetic radiation can be uniquely assigned to an emission region in process step B). In process step C), the electromagnetic radiation detected by the detector is assigned to an emission region, whereby the position at which the electromagnetic radiation of each emission region is detected can also be assigned to the emission region. Thus, in process step D), each emission region can be uniquely assigned to one of the groups.

According to at least one embodiment of the method, the detector has a two-dimensional resolution in the first and second lateral directions. In particular, the detector comprises an objective by means of which the electromagnetic radiation emitted by the 3D display element is projected on the detector. In particular, the electromagnetic radiation of at least one zone is imaged on the detector. Furthermore, the electromagnetic radiation of several zones can be imaged on the detector. In this way, several perspectives, which are displayed by the 3D display element, can be acquired at different times by means of the detector, so that an assignment of the emission regions to individual groups is particularly simplified.

According to at least one embodiment of the method, process steps A) to C) are repeated several times, the detector being arranged one after the other in different positions within the field of view with each repetition of process step A). For example, the detector is arranged in the field of view in such a way that exactly one zone is imaged on the detector at each given position. This makes it particularly easy to determine which emission regions are to be assigned to a common group in order to represent a perspective of the image. For example, the number of repetitions of process steps A) to C) is as high as the number of perspectives that are displayed using the 3D display element. In particular, emission regions whose electromagnetic radiation cannot be detected within the field of view are assigned to the further group, by means of which no perspective of the image is displayed during intended operation.

Further advantages and advantageous embodiments and further embodiments of the 3D display element, the 3D display system, the method of operating a 3D display element and the method of operating a 3D display system result from the following exemplary embodiments presented in connection with the figures.

FIGS. 1, 2, 3, 4 and 5 show exemplary embodiments of 3D display elements and procedures for operating 3D display elements.

FIG. 6 shows a schematic sectional view of an exemplary embodiment of a 3D display system and an embodiment of a process for operating a 3D display system.

Identical, similar or similar acting elements are provided with the same reference signs in the figures. The figures and the proportions of the elements shown in the figures are not to be regarded as true to scale. Rather, individual elements may be oversized for a simplified representability and/or a simplified comprehensibility.

Figure 1:
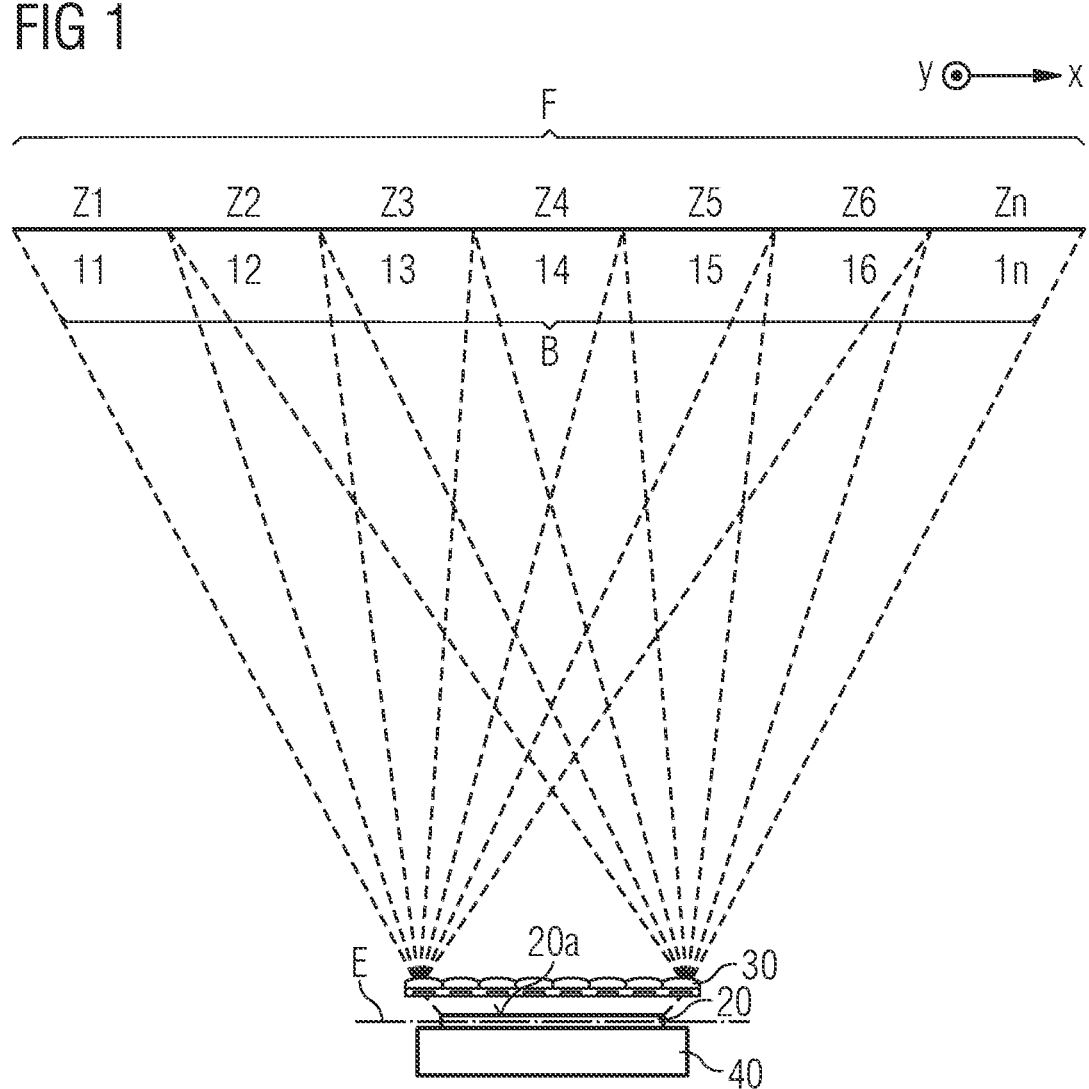

FIG. 1 shows a schematic sectional view of an exemplary embodiment of a 3D display element 2 with a plurality of emission regions 20, which are designed to emit electromagnetic radiation L. The emission regions 20 are arranged next to each other in a lateral plane E. At least some emission regions 20 are assigned to a first 21 or a second 22 group. In particular, at least some emission regions 20 are assigned to a first 21, a second 22, a third 23, a fourth 24, a fifth 25, a sixth 26 or an n-th group 2$n$. Using the emission regions of the first group 21, a pixel 100 of a first perspective 11 of an image can be displayed. Using the emission regions 20 of the nth group 2$n$, a pixel 100 of an nth perspective 1$n$ of image B can be displayed. In particular, a perspective of the image can be represented by means of the emission regions 20 of a group. The sum of all emission regions 20 is greater than the sum of all pixels 100 of all perspectives 11, 12, ... 1$n$.

The 3D display element 2 comprises an optical element 30, which is arranged downstream of the multitude of emission regions 20 in a radiation direction Z. The optical element 30 directs electromagnetic radiation L of the first group 21 into a first zone Z1 within a field of view F. Furthermore, the optical element 30 directs electromagnetic radiation L of emission regions 20 of the nth group 2$n$ into an nth zone Zn within the field of view F. In particular, the optical element 30 directs electromagnetic radiation L of emission regions 20, which are assigned to a common group, into a common zone. The zones are arranged next to each other in the first lateral direction X. In particular, the first lateral direction X extends perpendicular to the radiation direction Z of the emission regions 20.

Furthermore, the 3D display element 2 comprises a memory in which calibration data 400 are stored. For example, the memory and the emission regions 20 and the optical element 30 can be mechanically fixed to each other. The calibration data 400 define the allocation of the emission regions 20 to the groups 21, 22, 23, 24, 25, 26, 2$n$. The emission regions of different groups 21, 22, 23, 24, 25, 26, 2$n$ are arranged next to each other in a common lateral plane E. The emission regions 20 form an emission surface 20$a$, through which the emission regions emit electromagnetic radiation during normal operation. The emission regions of 20 different groups are distributed over the entire emission surface 20$a$. In particular, the emission regions of a group 21, 22, 23, 24, 25, 26, 2$n$ are arranged adjacent to at least one emission region 20 of another group 21, 22, 23, 24, 25, 26, 2$n$.

In FIG. 1, the lines sketching the beam path of electromagnetic radiation L describe the electromagnetic radiation of all emission regions 20 of a same group 21, 22, 23, 24, 25, 26, 2$n$. The electromagnetic radiation L of emission regions 20 of a group 21, 22, 23, 24, 25, 26, 2$n$ respectively constitute the perspectives 11, 12, 13, 14, 15, 16, 1$n$ in the individual zones Z1, Z2, Z3, Z4, Z5, Z6, Zn of the field of view F. In intended operation, different perspectives 11, 12 of an image B can be perceived by a viewer within the field of view F in zones Z1, Z2, Z3, Z4, Z5, Z6, and Zn. If a viewer simultaneously perceives two different perspectives 11, 12, 13, 14, 15, 16, 1$n$ in zones Z1, Z2, Z3, Z4, Z5, Z6, Zn, which are along the first X or second Y lateral direction adjacent to each other, a three-dimensional image impression of image B is created for the viewer.

Figure 2:
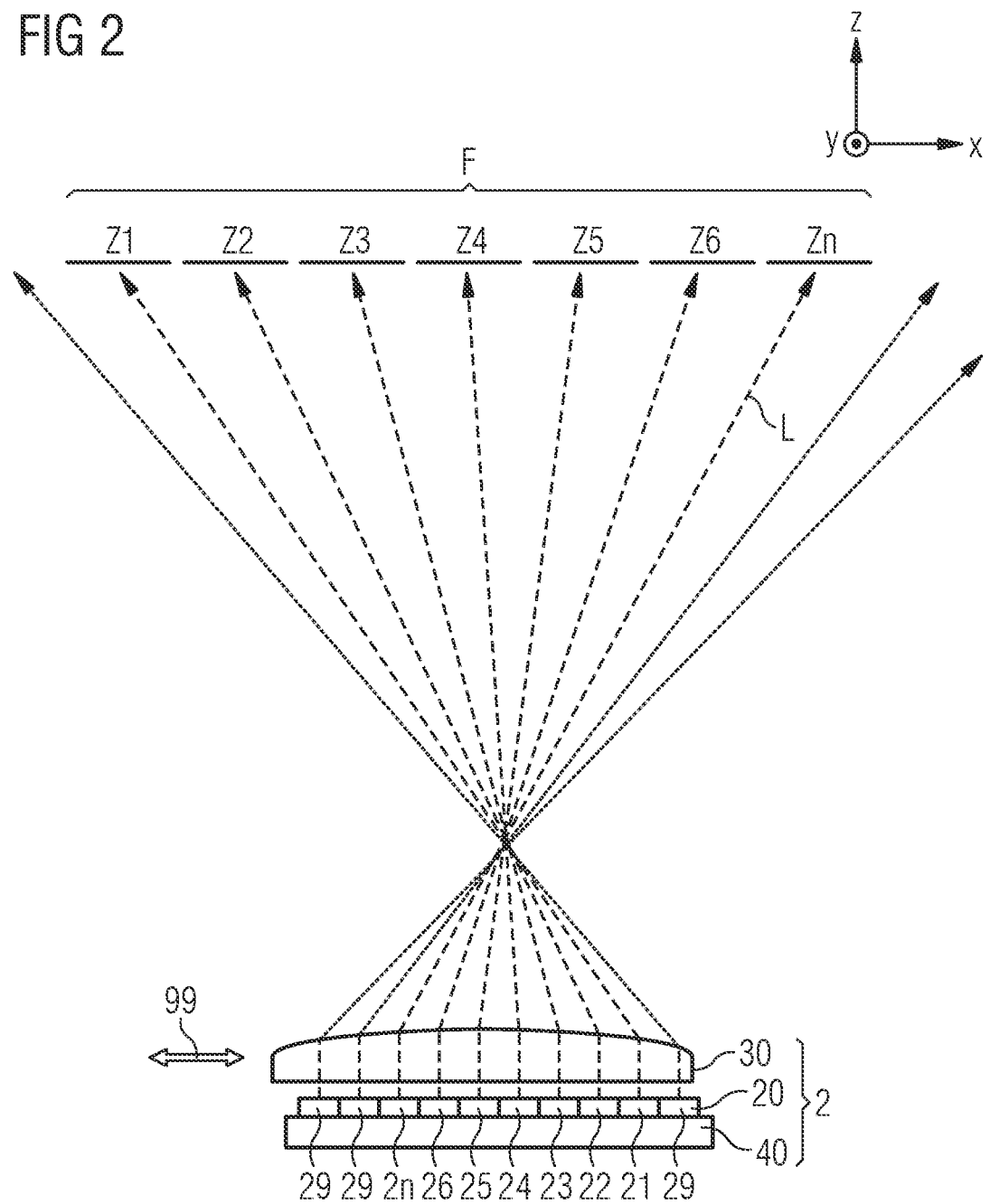

FIG. 2 shows a schematic sectional view of a 3D display element 2 according to an exemplary embodiment. In contrast to the exemplary embodiment shown in FIG. 1, FIG. 2 uses the arrows representing electromagnetic radiation L to sketch the electromagnetic radiation L of an individual emission region 20. The 3D display element 2 has an emission region 20 of the first group 21, an emission region 20 of the second group 22, an emission region 20 of the third group 23, an emission region 20 of the fourth group 24, an emission region 20 of the fifth group 25, an emission region 20 of the sixth group 26 and an emission region 20 of the nth group 2n. The electromagnetic radiation L of the emission regions 20 of the different groups 21 to 2n is directed into the zones Z1 to Zn. In addition, the 3D display element 2 has emission regions 20 of a further group 29. No perspective of the image B within the field of view F can be represented by means of the electromagnetic radiation L of the emission regions 20 of the further group 29. The electromagnetic radiation L from emission regions 20 of the further group 29 is directed into none and/or into different zones Z1 to Zn in the field of view F. Emission regions 20 are uniquely assigned to groups 21 to 29. Using the emission regions 20 of the first group 21, for example, a pixel 100 of the first perspective 11 of image B can be displayed. Using the emission regions 20 of a group 21, 22, 23, 24, 25, 26, 2n, a pixel 100 of a perspective 11, 12, 13, 14, 15, 16, 1n of image B can be displayed. Using the emission regions 20 of the further group 29, no pixel within the field of view F can be displayed. In particular, during intended operation the emission regions 20 of the further group 29 are not or never operated.

For example, the calibration data 400 are stored in memory 40. The calibration data uniquely assign the emission regions 20 to groups 21, 22, 23, 24, 25, 26, 2n, 29. In normal operation, the emission regions 20 are operated, in particular not operated, depending on their assignment to groups 21, 22, 23, 24, 25, 26, 2n, 29. Electromagnetic radiation L is directed into a common zone Z1 to Zn in the intended operation of emission regions 20 of a group 21 to 2n. Electromagnetic radiation L from emission regions of 20 different groups 21 to 2n is directed into different zones Z1 to Zn. For example, a perspective 11 to 1n of the Image B is constituted by means of a group 21 to 2n of emission regions 20.

The optical element 30 is arranged downstream of the emission regions 20 in the direction of radiation Z. In the presence, the optical element 30 has an alignment error 99, whereby the optical element 30 is displaced in the first lateral direction X, so that the optical element 30 is not centrally located above the emission regions 20 assigned to the optical element 30. This adjustment error 99 can be compensated by means of display element 2, since the number of emission regions 20 is greater than the number of pixels 100 to be displayed. Thus it is possible not to operate a portion of the existing emission regions 20 and still display all pixels 100 of all perspectives 11 to 1n.

Figure 3:
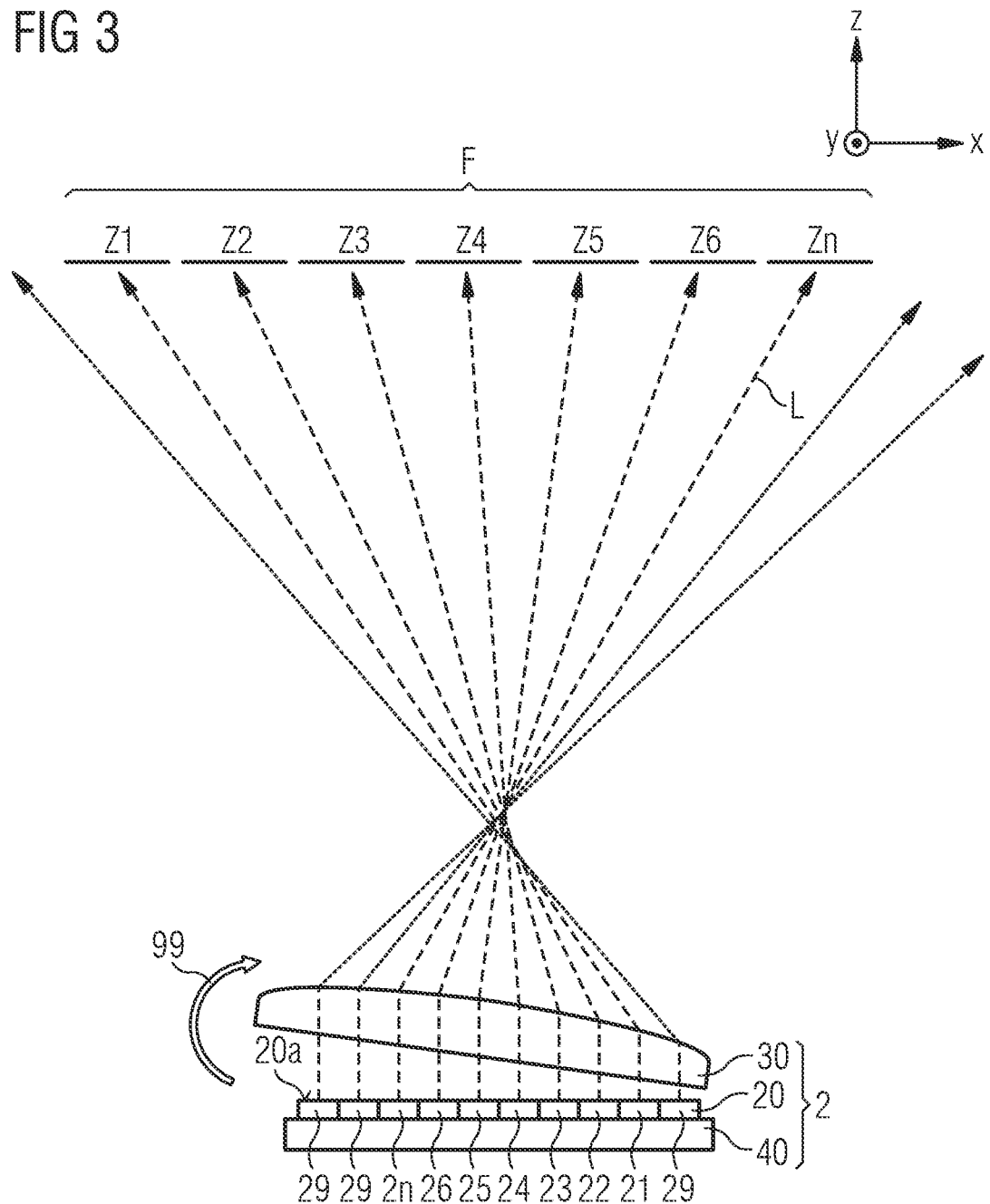

FIG. 3 shows a schematic sectional view of an exemplary embodiment of a 3D display element 2. In contrast to the display element shown in FIG. 2, the optical element 30 has an alignment error 99, whereby the optical element 30 is tilted relative to the emission surface 20a. Thus, the optical element 30 is not parallel to the emission surface 20a. Thus, the exemplary embodiments in FIGS. 2 and 3 show different adjustment errors 99. The different adjustment error 99 causes the electromagnetic radiation L of the emission regions 20 to be directed into different zones Z1 to Zn by means of the optical element 30. Thus, the emission regions 20 of the exemplary embodiments in FIGS. 2 and 3 have different assignments of emission regions 20 to groups 21, 22, 23, 24, 25, 26, 2n, 29.

FIG. 4 shows a schematic plan view of the emission surface 20a of an exemplary embodiment of a 3D display element 2, where the emission regions 20 are designed to emit electromagnetic radiation L and the emitted electromagnetic radiation L is directed into a field of view F. The field of view F has a first zone Z1, a second zone Z2 and a third zone Z3. In the first zone Z1 a first perspective 11 of an image B is constituted by means of the emission regions 20 of the first group 21. In the second zone Z2, a second perspective 12 of image B is displayed using electromagnetic radiation L from emission regions 20 of the second group 22. In the third zone Z3 a third perspective 13 of figure B is constituted by electromagnetic radiation L of the emission regions 20 of the third group 23. The assignment of emission regions 20 to groups 21, 22, 23, 29 is stored in memory 4. The emission regions of 20 different groups 21, 22, 23, 29 are arranged next to each other in a common lateral plane E and form the emission surface 20a. The emission regions 20 of the different groups 21 to 29 are distributed over the entire emission surface 20a.

The allocation of emission regions 20 to groups 21, 22, 23, 29 is determined before the intended operation of the emission regions. The sum of pixels 100 of all perspectives is 48 and the sum of all emission regions 20 is 64, so the sum of all emission regions 20 is greater than the sum of all pixels 100 of all perspectives 11, 12, 13; in particular, the sum of emission regions 20 is at least 5%, preferably at least 10%, preferably at least 25% greater than the sum of all pixels 10 of all perspectives 11, 12, 13. For example, the number of emission regions 20 of the further group 29 corresponds to the difference between the sum of emission regions 20 and the sum of pixels 100 of all perspectives 11, 12, 13.

FIG. 5 shows a schematic plan view of the emission surface 20a of an exemplary embodiment of the 3D display element. In contrast to the exemplary embodiment shown in FIG. 4, zones Z1 to Z4 are arranged side by side in the first lateral direction X and in the second lateral direction Y within the field of view. Thus, a three-dimensional representation of an image can be perceived by a viewer within the field of view F both along the first lateral direction X and along the second lateral direction Y.

FIG. 6 shows a schematic section of an exemplary embodiment of a 3D display system 1 with a 3D display element 2 and a detector 5. The detector 5 is arranged downstream of the 3D display element in the direction of radiation Z within the field of view F at a predetermined position P. The electromagnetic radiation L can be detected by detector 5 and can be uniquely assigned to an emission region 20 of the 3D display element. The 3D display system 1 comprises a memory 40 and calibration data 400 can be determined by means of detector 5. The calibration data 400 are stored in memory 40.

When operating the 3D display system, the detector 5 is arranged downstream of the 3D display element 2 at a predetermined position P within the field of view F in the direction of radiation Z in process step A). In a process step B), the emission regions emit 20 electromagnetic radiation L, whereby the electromagnetic radiation L of each emission region 20 can be uniquely assigned to it. In a process step C) the electromagnetic radiation L is detected by means of detector 5. In a process step D), each zone in field of view F is uniquely assigned to a group of emission regions 20. The calibration data 400 are created from this assignment and stored in memory 40. Detector 5 has a two-dimensional resolution in the first and second lateral directions X, Y. Thus, for example, the electromagnetic radiation L, which is directed into one of the zones Z1 to Zn in the field of view F, can be detected by means of detector 5 and assigned to an emission region 20.

Process steps A) to C) are repeated several times, the detector 5 being arranged successively at different predetermined positions P within the field of view F at each repetition of process step A). For example, for each repetition, the total of all emission regions 20 to be assigned to a common group can be determined. For example, in a first process step, all emission regions 20 are directed into a first zone Z1 using electromagnetic radiation L and assigned to the first group 21. This process is repeated until each zone Z1 to Zn within the field of view F is assigned as many emission regions 20 that each pixel 100 of each perspective 11 to 1n can be represented by means of an emission region 20. Emission regions 20 can be assigned to the further group 29 according to process step D), so that they are not used to represent a pixel 100 within the field of view F during intended operation. In particular, electromagnetic radiation L of emission regions 20, which are assigned to the further group 29, is not detected within the field of view F by detector 5.

The invention is not limited to these by the description based on the exemplary embodiments. Rather, the invention includes each new feature and each combination of features, which includes in particular each combination of features in the patent claims, even if this feature or this combination itself is not explicitly indicated in the patent claims or implementation examples.

This patent application claims the priority of the German Patent Application 102017120648.5, the disclosure of which is hereby incorporated by reference.

LIST OF REFERENCE SIGNS 2 3D display element
5 Detector
6 3D display system
11 first perspective
12 second perspective
13 third perspective
14 fourth perspective
15 fifth perspective
16 sixth perspective
1n nth perspective
20 emission region
20a emission surface
21 first group
22 second group
23 third group
24 fourth group
25 fifth group
26 sixth group
2n nth group
29 further group
30 optical element
31 lens
40 memory
99 adjustment error
100 pixel
400 calibration data
B image
E lateral plane
F field of view
L electromagnetic radiation
P position
X first lateral direction
Y second lateral direction
Z direction of radiation
Z1 first zone
Z2 second zone
Z3 third zone
Z4 fourth zone
Z5 fifth zone
Z6 sixth zone
Zn nth zone

The invention claimed is:

1. A 3D display system comprising
a 3D display element comprising:
    a plurality of emission regions adapted to emit electromagnetic radiation; and
    an optical element arranged downstream of the plurality of emission regions in a radiation direction,
wherein at least some emission regions are assigned to a first group, at least some emission regions are assigned to a second group and at least some emission regions are assigned to a third group,
wherein a pixel of a first perspective of an image is represented by each emission region of the first group,
wherein a pixel of a second perspective of the image is represented by each emission region of the second group,
wherein a sum of all emission regions is greater than a sum of all pixels of all perspectives,
wherein the optical element is configured to direct electromagnetic radiation of the emission regions of the first group into a first zone within a field of view,
wherein the optical element is configured direct electromagnetic radiation of the emission regions of the second group into a second zone within the field of view,
wherein the optical element is configured to direct electromagnetic radiation of emission regions of the third group into a third zone within the field of view,
wherein the first zone is arranged directly adjacent to the second zone in the field of view in a first lateral direction,
wherein the third zone is arranged directly adjacent to the first and/or second zone in the field of view in a second lateral direction, and
wherein the second lateral direction is perpendicular to the first lateral direction.

2. The 3D display system according to claim 1, further comprising a memory in which calibration data are stored, wherein the calibration data is configured to determine the assignment of the emission regions to the first and second groups.

3. The 3D display system according to claim 1, wherein some of the emission regions are assigned to a further group, and wherein
electromagnetic radiation emitted by the emission regions of the further group does not represent a perspective of the image within the field of view.

4. The 3D display system according to claim 1, wherein the emission regions of different groups are arranged side by side in a common lateral plane and the emission regions form a common emission surface, and wherein the emission regions of different groups are respectively distributed over the entire emission surface.

5. The 3D display system according to claim 1, further comprising a memory, wherein the memory is configured to store calibration data, and wherein the calibration data is determined by a detector.

6. The 3D display system according to claim 1, further comprising a detector arranged downstream of the 3D display element in the radiation direction at a predetermined position in the field of view, wherein electromagnetic radiation emitted by the emission regions is detectable by the detector.

7. The 3D display system according to claim 6, wherein the electromagnetic radiation is uniquely assigned to the emission regions.

8. A method for operating a 3D display element comprising
- a plurality of emission regions adapted to emit electromagnetic radiation and
- an optical element arranged downstream of the plurality of emission regions in a radiation direction, the method comprising:
- uniquely assigning at least some emission regions to a first group, at least some emission regions to a second group, at least some emission regions to a third group and at least some emission regions to a further group,
- wherein a pixel of a first perspective of an image is represented by each emission region of the first group, and
- wherein a pixel of a second perspective of the image is represented by each emission region of the second group,
- wherein a sum of all emission regions is greater than a sum of all pixels of all perspectives,
- wherein emission regions of the further group are not operated,
- wherein the optical element directs electromagnetic radiation of the emission regions of the first group into a first zone within a field of view,
- wherein the optical element directs electromagnetic radiation of the emission regions of the second group into a second zone within the field of view,
- wherein the optical element directs electromagnetic radiation of emission regions of the third group into a third zone within the field of view,
- wherein the first zone is arranged directly adjacent to the second zone in the field of view in a first lateral direction, and the third zone is arranged directly adjacent to the first and/or second zone in the field of view in a second lateral direction, and
- wherein the second lateral direction is perpendicular to the first lateral direction.

9. The method according to claim 8, further comprising storing calibration data in a memory,
- wherein the calibration data are used to assign the emission regions to a group, and
- wherein the emission regions are operated depending on the assignment to a group.

10. The method according to claim 8,
- wherein electromagnetic radiation is directed from each emission region of a group into a common zone,
- wherein electromagnetic radiation from emission regions of different groups is each directed into different zones, and
- wherein each perspective of the image is respectively represented by a group of emission regions.

11. The method according to claim 8,
- wherein different zones are arranged along a first and/or second lateral direction side by side in the field of view.

12. A method for operating a 3D display system comprising
- a 3D display element with a plurality of emission regions adapted to emit electromagnetic radiation and
- a detector, wherein
- at least some emission regions are assigned to a first group and at least some emission regions are assigned to a second group, wherein
- a pixel of a first perspective of an image is represented by each emission region of the first group, wherein
- a pixel of a second perspective of the image is represented by each emission region of the second group, and
- wherein a sum of all emission regions is greater than a sum of all pixels of all perspectives, the method comprising:
- A) arranging the detector downstream of the 3D display element in a radiation direction at a predetermined position within a field of view;
- B) emitting, by the emission regions, electromagnetic radiation, wherein the electromagnetic radiation of each emission region is uniquely assignable to this emission region;
- C) detecting, by the detector, the electromagnetic radiation; and
- D) uniquely assigning a group of emission regions to each zone in the field of view, wherein calibration data are generated from steps C) and D) and the calibration data are stored in a memory,
- wherein the method steps A) to C) are repeated several times, and
- wherein the detector is arranged successively at different predetermined positions within the field of view at each repetition of the method step A).

13. The method according to claim 12, wherein
the detector has a two-dimensional resolution in first and second lateral directions.

14. The method according to claim 12, wherein
some of the emission regions are assigned to a further group, and wherein
the electromagnetic radiation emitted by the emission regions of the further group does not represent a perspective of the image within the field of view.

* * * * *